United States Patent [19]

Sato et al.

[11] 4,300,838
[45] Nov. 17, 1981

[54] MIXING AND KNEADING MACHINE

[75] Inventors: Norimoto Sato, Ogawahigashi; Minoru Miyaoka, Hachioji; Shin Yamasaki, Tokorozawa; Kimio Inoue; Akimasa Kuriyama, both of Kobe; Tsugushi Fukui, Miki; Toshihiro Asai, Kobe, all of Japan

[73] Assignees: Bridgestone Tire Co., Ltd., Tokyo; Kobe Steel, Ltd., Kobe, both of Japan

[21] Appl. No.: 50,996

[22] Filed: Jun. 22, 1979

[30] Foreign Application Priority Data

Jun. 23, 1978 [JP] Japan .................................. 53-76686
Jun. 23, 1978 [JP] Japan .................................. 53-76688

[51] Int. Cl.³ .......................... A21C 1/06; B01F 7/04
[52] U.S. Cl. ........................................ 366/84; 366/97; 366/297
[58] Field of Search ................. 366/84, 91, 97, 297, 366/299, 300, 301, 292, 327, 328, 329, 317; 425/204, 208, 209

[56] References Cited

U.S. PATENT DOCUMENTS

| | | | |
|---|---|---|---|
| 1,200,070 | 10/1916 | Banbury | 366/91 |
| 2,231,911 | 2/1941 | Hitt | 366/300 |
| 2,309,594 | 1/1943 | Hutchings | 146/122 |
| 2,559,418 | 7/1951 | Ford | 366/95 |
| 2,736,754 | 2/1956 | Webb | 366/75 |
| 2,820,618 | 1/1958 | Bolling | 366/297 |
| 2,987,760 | 6/1961 | Grubenmann | 366/91 |
| 3,230,581 | 1/1966 | Tyson | 366/297 X |
| 3,403,894 | 10/1968 | Matsuoka | 366/97 |
| 3,403,949 | 10/1968 | Matsuoka | 366/97 |

FOREIGN PATENT DOCUMENTS

| | | | |
|---|---|---|---|
| 1454771 | 12/1962 | Fed. Rep. of Germany | 366/84 |
| 820147 | 7/1937 | France | 366/84 |
| 17-27032 | 12/1942 | Japan | 366/84 |
| 4943330 | 1/1943 | Japan | 366/84 |

Primary Examiner—Edward J. McCarthy
Attorney, Agent, or Firm—Oblon, Fisher, Spivak, McClelland & Maier

[57] ABSTRACT

An internal mixer includes a pair of rotors each having spiral vanes adapted to advance materials in the axial direction of the rotors. More particularly, each of the respective rotors has a long vane and a short vane and each of the vanes is of a spiral direction. The spiraling or screwing direction of the long vane is the same as the screwing direction of the short vane on the respective rotors. The flow of the materials along the axial direction differs from one rotor to another. Also disclosed is a mixing and kneading machine including a pair of parallel rotors each having a long vane and a short vane, the long vane extending spirally about the center lines of the rotors and the short vane extending along the center lines of the rotors. Flowing behavior of material to be mixed and kneaded occurs in opposing directions between both rotors.

6 Claims, 12 Drawing Figures

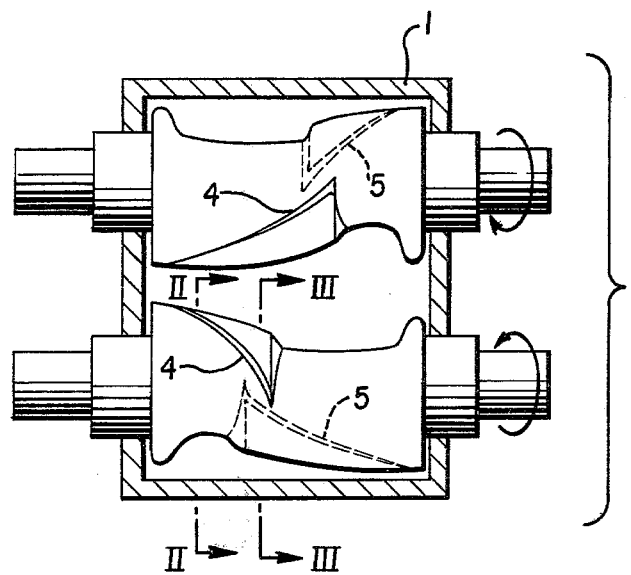
FIG. 1
PRIOR ART
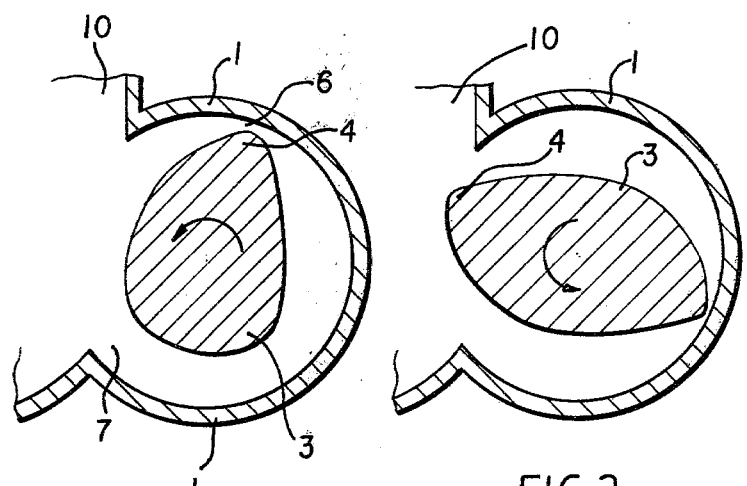
FIG. 2
PRIOR ART
FIG. 3
PRIOR ART

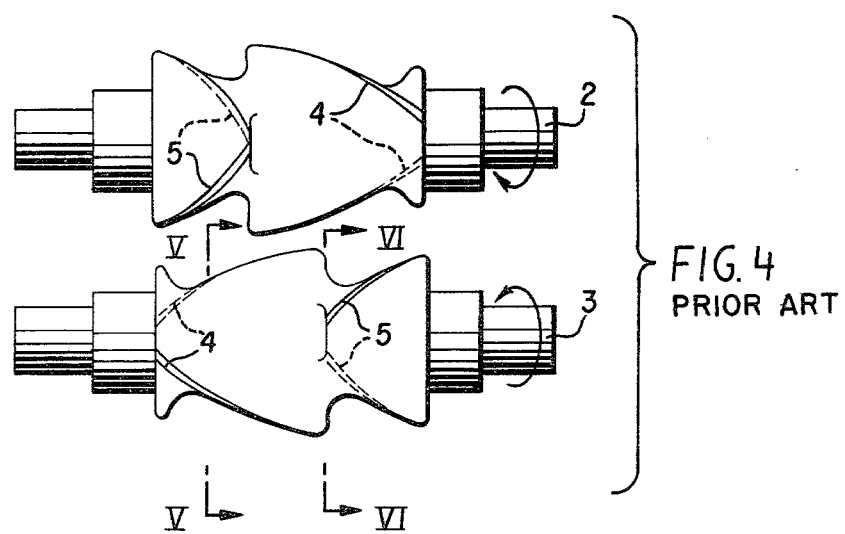
FIG. 4
PRIOR ART
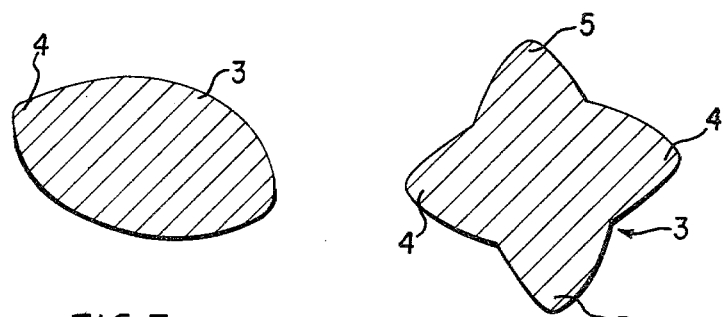
FIG. 5
PRIOR ART
FIG. 6
PRIOR ART

MIXING AND KNEADING MACHINE

BACKGROUND OF THE INVENTION

1. Field of the Invention

This invention relates to a mixing and kneading device in a so-called internal mixer which performs a thorough mixing and kneading operation irrespective of the kind of materials.

2. Description of the Prior Art

The internal mixer is a batch type kneader suitable for the intermingling of rubber and one of indispensable facilitites in the rubber industry, for example, in tire manufacturers as a mixer suitable for mastification of rubber, carbon master batch kneading of rubber or kneading of a vulcanizing agent commonly known as pro-kneading.

A prior art internal mixer, as indicated in FIGS. 1 through 3, includes a pair of parallel rotors 2, 3 provided within a chamber 1 for rotation in opposing directions to each other, each of which has a long vane 4 and a short vane 5. Both vanes extend spirally about the axis of the rotors. The spiraling or screwing direction of the long vanes is opposite to that of the short vanes. Materials introduced via a hopper not shown are sent under pressure from a supply inlet 10 into a mixing chamber 7 by the breaking-into action of the rotors and the depressing action of a floating weight. After being subjected to the rolling action by the rotors, the materials are ground between the edges of the vanes of the rotors and the inside wall of a casing (viz. a chip clearance 6), advancing in the axial direction of the rotors. These events occur on the long vanes and short vanes independently of each other. Since the screwing direction of the long vanes differs from that of the short vanes, the materials run from the edge to the center with respect to the respective rotors and the mixed and kneaded materials are delivered from the bottom of the chamber.

Another prior art embodiment, as indicated in FIGS. 4 to 6, includes a so-called four-vane rotor having two long vanes and two short vanes; a total of four vanes on each of the rotors. It is well known that, while construction is substantially the same, the four-vane rotor has a double chip in comparison with the above described two-vane rotor, promoting microscopic dispersion of an additive and assuring a high degree of mixing and kneading efficiency.

In order to produce a homogeneous mixture, macroscopic dispersion also is of great importance whereby the materials are uniformly mixed with keeping a uniform density of an additive everywhere in the resultant mixture and a uniform density of the mixture itself. For example, failure to produce a homogeneous mixture of a vulcanizing agent in the pre-kneading step of the manufacture of tires results in unevenness of physical properties of final products and difficulties in manufacturing quality tires. While the proportion of steel radial tires with steel cords embedded in the tires to overall tires has been increased more and more from a safety standpoint in high speed driving, there has been a trend to employ as rubber for such steel radial tire used materials which are much more hard per se and it is therefore more difficult to obtain a homogeneous mixture and dispersion than with conventional rubber material. To this end the prior art internal mixer lacked satisfactory strength of the mixing and kneading device and sufficient dispersibility of various agents.

SUMMARY OF THE INVENTION

With the foregoing in mind, it is an object of the present invention to provide a mixing and kneading machine which accomplishes thorough intermingling of materials irrespective of the kind of materials even from a macroscopic point of view while considering movement of the materials within the internal mixer in operation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a plan view of rotors in a prior art internal mixer;

FIGS. 2 and 3 are cross-sectional views, respectively, along the lines II—II and III—III of FIG. 1;

FIG. 4 is a plan view of another type of prior art rotors;

FIGS. 5 and 6 are cross-sectional views, respectively, along the lines V—V and VI—VI of FIG. 4;

DETAILED DESCRIPTION OF THE PREFERRED EMBODIMENTS

Respective rotors of conventional mixers have spiral vanes adapted to advance materials in the axial direction of the rotors as seen from FIGS. 1 through 6. Movement of the materials within the interior of a mixing chamber can be thus regarded as divided into a flow of the materials in the axial direction of the rotors and a flow between the left hand and right hand sides of the mixing chamber receiving the rotors therein. To produce a homogeneous mixture, it is necessary to accelerate both the flow along the axial direction and the flow between both sides of the mixing chamber while keeping the materials from staying within the mixing chamber.

With pro-kneading of hard rubber by means of the internal mixer (internal volume: 236l) having the four-vane rotors, it was found that dispersion of the agents was markedly nonuniform in some kinds of rubber and the four-vane machine was substantially inferior in dispersing performance of an additive to the two-vane counterpart. To resolve such problem, a test machine was made and flowing behavior of the materials within the mixer was carefully observed. A barrel of the test machine was made by acrylic resin and configured to enable direct observation of flow of the materials therein. Moreover, in order to evaluate quantitatively the degree of dispersion, a prescribed amount of colored plastic beads (polystyrene) was added and after kneading the number of the beads contained within a given sample were measured repeatedly (n times) and displayed in terms of deviations ($\sigma_{n-1}$). The test machine was made with the same dimensioning as an internal mixer of 1.7 l of internal volume. An aqueous solution with 30% of CMC (carboxymethyl-cellulose) was found suitable as a material showing flowing behavior similar to hard rubber within widely available mixers and actually used in the inventor's experiments.

Figure 7A:
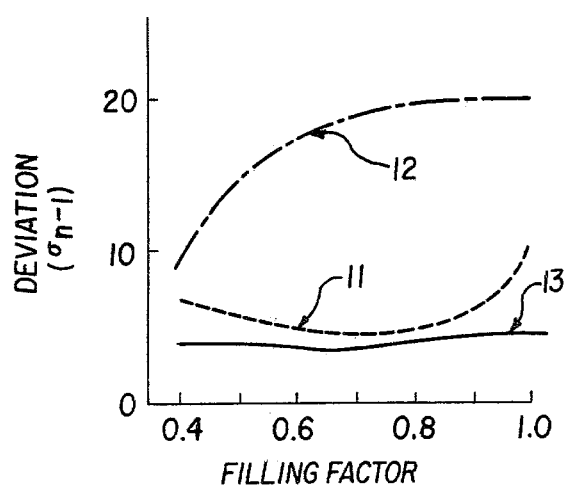
FIGS. 7a and 7b are graphs showing dispersing performances of rotors embodying the present invention and the prior art.
Figure 7B:
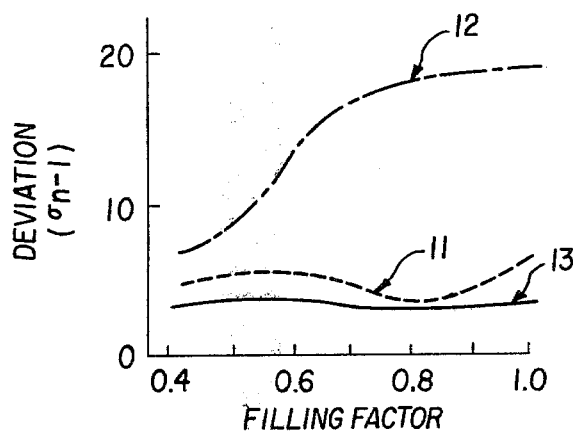

The findings of kneading experiments on the test materials using the two-vane rotors and the four-vane rotors within the test machine are depicted in FIGS. 7(a) and 7(b) wherein FIG. 7(a) showed the bead deviation with 40 sec. of kneading operation and FIG. 7(b) showed the same with 60 sec. of kneading operation. As compared with the curve 12 concerning the four-vane rotors, the curve 11 in the case of the two-vane rotors suggested that bead dispersion was better throughout a wide range of filling factor (a volume ratio of the material to the mixing chamber) of 0.4 to 1.0 and homogeneous dispersion was assured for a shorter period of kneading. In contrast to this, the four-vane rotors performed only rather deficient dispersion with increasing filling factor and was not able to improve dispersion performance with an extended period of kneading. The reason why the four-vane rotors were inferior in dispersion performance was that the two long vanes and the two short vanes on each rotor were twisted in such a direction as to push the materials toward the central portion thereof.

While as best seen from FIG. 6 the respective edges of the vanes was disposed 90° out of phase from each other to facilitate movement of the materials at the central portion where the long vanes were most closely located to the short vanes, the materials flowing from one end of the rotor axis to the central portion due to the action of the long vanes could not be advanced toward the other end after leaving the edges of the long vanes. The results were that a portion of the materials was reverted to the central portion due to the action of the short vanes having the opposite direction of twisting to the long vanes so that the reverting materials were in conflict with the advancing materials. It was therefore revealed that such conflict caused deficiency of a flow of the materials along the axial direction. Contrarily, in the case of the two-vane rotors, while the edges of the long vanes were overlapped in part with the edges of the short vanes at the central portion as shown in FIG. 1, the materials flowing toward the central portion of the rotor axis were released by the edge portions of the long vanes to flow into a cavity on the rear side of the short vanes and then pushed toward the long vanes. Although flow of the materials itself was identical to the four-vane rotors, each of the rotors had only a single long vane and a single short vane so that there was wider room for movement of the materials, thereby accelerating axial flow of the materials and assuring a homogeneous mixture.

With respect to deficient kneading due to such insufficient flow of the materials in the four-vane rotor structure, one approach was suggested by David Z. Taison et al as fully disclosed in Japanese Patent Publication No. 42-27032. The cross-sectional configuration of the long vane and the short vane was designed in order to reduce expansion of cross-sectional area of the rotor close to the center thereof for improving flow of the materials for homogeneous dispersion.

Figure 8:
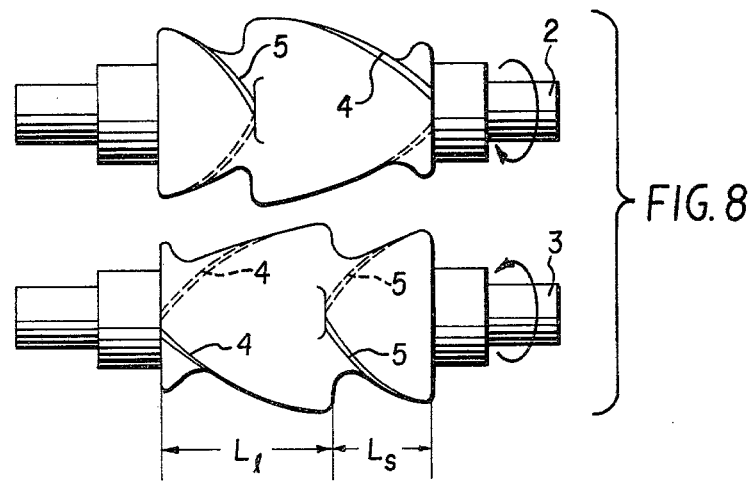
FIGS. 8 and 11 are plan views of the first and second embodiments of the present invention.

The inventors likewise have tried such approach for the purpose of mixing and kneading hard rubber but with unsatisfactory results. The inventors, therefore, made extensive investigations on a variety of shapes of vanes to utilize successfully highly efficient kneading performance inherent to the four-vane rotor, using the above described CMC aqueous solution with behavior similar to hard rubber. As a result, they found it most desirable to shape and design the vanes as depicted in FIG. 8. Each of a pair of parallel rotors 2, 3 has a long vane 4 and a short vane 5 and each of the vanes is of a spiral shape to push the materials toward the axial direction, as is well known. Important features of the present invention are that the spiraling or screwing direction of the long vane is the same as the screwing direction of the short vane on the respective rotors and flow of the material along the axial direction differs from one rotor to another. Should the direction of flow be the same on the long and short vanes in this way, axial flow of the material is accelerated without retention in the central portion so that the material flows with rolling movement as an aggregate while being folded back itself by the rotors.

As indicated by the curve 13 in FIG. 7, the above described vane structure can disperse plastic beads throughout the CMC aqueous solution with a higher degree of uniformity which showed excellent dispersion capability before. Preferably homogeneous dispersion is possible within a wide range of filling factors.

The foregoing is also true when the above described vane structure is applied to generally used mixers in pre-kneading a vulcanizing agent in rubber. The kneading of a vulcanizing agent is commonly known as pre-kneading and requires the condition that rubber temperature be below a predetermined temperature (say, 110° C.) to inhibit vulcanizing reactions with various agents during kneading. It is further required that thorough dispersion be accomplished without a temperature rise. Although, as suggested in Japanese Utility Model Publication No. 49-43330, a consecutive vane structure provided with short vanes and long vanes alternatively with each other was considered to be sufficient to achieve the sole purpose of enhancing rolling movement of materials within a mixing chamber, it has been revealed that the suggested device underwent a short temperature rise and was not suitable for pre-kneading. In addition, the present invention makes it possible to reduce thrust force exerted upon the rotor during kneading to about half by splitting the vane structure into the long vanes and the short vanes as discussed above, in comparison with the consecutive structure.

EXAMPLE 1

Figure 9:
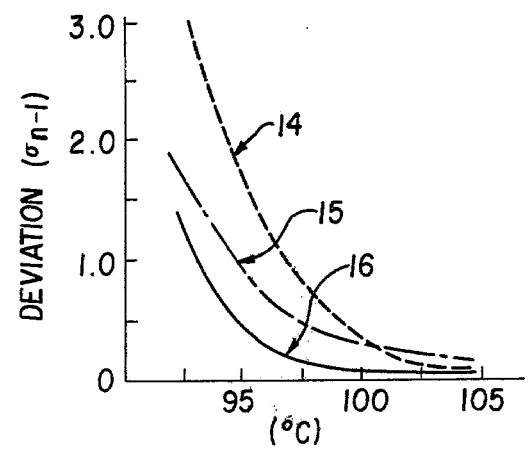
FIG. 9 shows the dependency of dispersibility upon temperature.
Figure 10:
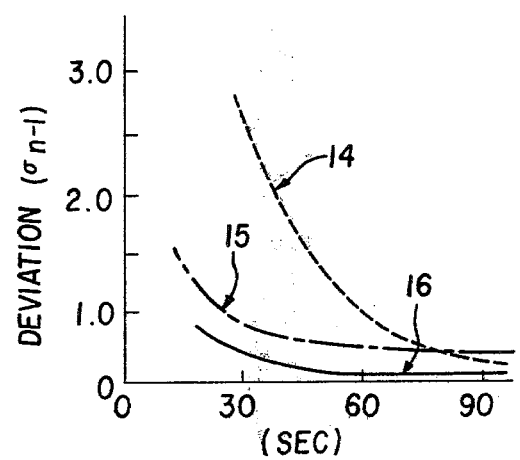
FIG. 10 shows the dependency of dispersibility upon duration of mixing.

Within an internal mixer with 4.3 l of internal volume, there were provided rotors each having two long vanes and two short vanes with a twist angle of 34.5°. A length ratio of the short vane to the long (Ls/Ll) was 0.49. The rotational rate of the rotors was 40 RPM. Comparison was made with the two-vane and four-vane rotors of the prior art type. The dependencies of dispersibility upon rubber temperature and duration of kneading are illustrated in FIGS. 9 and 10, respectively, when mixing and kneading a vulcanizing agent with hard rubber. In FIGS. 9 and 10, the curve 14 represents the conventional two-vane rotor, the curve 15 represents the conventional four-vane rotor and the curve 16 represents the rotor embodying the present invention. Dispersibility of an agent is evaluated in terms of deviation. A smaller value of deviation implies a more homogeneous dispersion of an agent. It is obvious from these drawings the rotor structure embodying the present invention disperses uniformly an additive and particularly a vulcanizing agent without the need to increase rubber content in the case of pre-kneading.

As noted earlier, the present invention assures good dispersion from macroscopic and microscipic points of view through the improved vane structure of the rotor. The present invention exhibits excellent properties for rubber kneading such as pro-kneading, mastification, and carbon master batch kneading. Although the above specific embodiment shows only an example of the four-vane rotor, it is obvious that two vanes or a much larger or smaller number of vanes are also applicable. Moreover, the present invention eliminates the need to make the central portion of the rotor thinner as experienced in the above referenced Japanese Patent Publication No. 42-27032, and enhances strength and durability.

Figure 11:
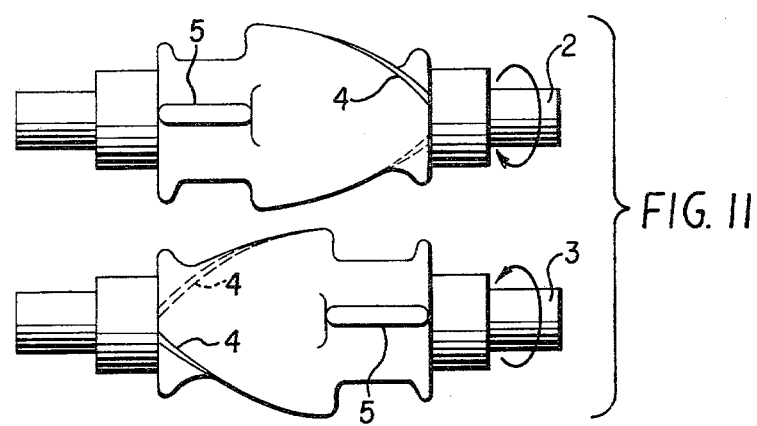

The inventors also found that it is desirable to shape and design the vanes as shown in Fig. 11, wherein each of a pair of parallel rotors 2, 3 has a long vane 4 and a short vane 5 and the long vane is of a spiral shape to push the materials toward the axial direction, as is well known. Important features of this embodiment are that the short vanes extend in parallel with the center lines of the rotors and flow of the materials along the axial direction differs from one rotor to another. Should the short vanes be provided in parallel with the axial direction of the rotors in this way, axial flow of the materials is accelerated without retention in the central portion so that the materials flow with rolling movement as an aggregate while being folded back themselves by the rotors.

The foregoing is also true of this embodiment when the above described vane structure is applied to generally used mixers in pre-kneading a vulcanizing agent in rubber. As mentioned previously, the kneading of a vulcanizing agent is commonly known as pre-kneading and requires the condition that rubber temperature be below a predetermined temperature (say, 110° C.) to inhibit vulcanizing reactions with various agents during kneading and it is further required that thorough dispersion be accomplished without a temperature rise. Although as suggested in Japanese Utility Model Publication No. 49-43330 a consecutive vane structure provided with short vanes and long vanes alternatively with each other was considered to be sufficient to achieve a sole purpose of enhancing rolling movement of materials within a mixing chamber, it is known that the suggested device underwent a short temperature rise and was not suitable for pre-kneading.

In addition, the second embodiment of the present invention makes it possible to reduce thrust force exerted upon the rotor during kneading to about half by splitting the vane structure into the long vanes and the short vanes as discussed above, in comparison with the consecutive vane structure.

The second embodiment of the present invention thus assures good dispersion from macroscopic and microscopic points of view through the improved vane structure of the rotor as well as exhibiting excellent properties for rubber kneading such as pro-kneading, mastification, and carbon master batch kneading.

Moreover, the present invention eliminates the need to make the central portion of the rotor thinner as experienced in the above referenced Japanese Patent Publication No. 42-27032, and enhances strength and durability.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed as new and desired to be secured by Letters Patent of the United States is:

1. A mixing and kneading machine including a mixing chamber defined by a casing comprising:
    a pair of parallel rotors disposed within said casing, each of said rotors having at least one long vane and at least one short vane both of which extend spirally about the center lines of each of the rotors and in the same direction of spiraling on each rotor such that flowing behavior of materials to be mixed and kneaded occur in opposing directions between each of said rotors and along the axis of each of said rotor; and
    means connected to said rotors for rotating said rotors in opposite directions.

2. The mixing and kneading machine as defined in claim 1, wherein each of said rotors has two long vanes and two short vanes.

3. The mixing and kneading machine as defined in claim 1 wherein said materials comprise hard rubber and a vulcanizing agent.

4. A mixing and kneading machine including a mixing chamber defined by a casing comprising:
    a pair of parallel rotors disposed within said casing, each of said rotors having at least one long vane and at least one short vane, said at least one long vane extending spirally about the center lines of the rotors and said at least one short vane extending along the center lines of the rotors such that flow behavior of materials to be mixed and kneaded occurs in opposing directions between each of said rotors along the axis of each of said rotors; and
    means connected to said rotors for rotating said rotors in opposite directions.

5. The mixing and kneading machine as defined in claim 1, wherein each of said rotors has at least two long vanes.

6. A mixing and kneading machine as defined in claims 1, 2, or 3, wherein said at least one short vane and said at least one long vane are in phase with respect to each other.

* * * * *